US011827162B2

(12) United States Patent
Do

(10) Patent No.: US 11,827,162 B2
(45) Date of Patent: Nov. 28, 2023

(54) METHODS FOR FORMING A HIDDEN AUDIO ASSEMBLY

(71) Applicant: Harman International Industries, Incorporated, Stamford, CT (US)

(72) Inventor: Sullivan Do, Ypsilanti, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 439 days.

(21) Appl. No.: 17/086,053

(22) Filed: Oct. 30, 2020

(65) Prior Publication Data
US 2022/0134966 A1 May 5, 2022

(51) Int. Cl.
*B60R 13/02* (2006.01)
*B60R 11/02* (2006.01)

(52) U.S. Cl.
CPC ...... *B60R 13/0212* (2013.01); *B60R 11/0217* (2013.01); *B60R 2013/0287* (2013.01)

(58) Field of Classification Search
CPC ............ H04R 2499/13; B60R 13/0212; B60R 13/0206; B60R 2013/0287; B60R 2011/028; B60R 11/0247
See application file for complete search history.

(56) References Cited

U.S. PATENT DOCUMENTS

| | | | | |
|---|---|---|---|---|
| 3,627,608 A * | 12/1971 | Steiner | .................... | B27D 1/08 264/156 |
| 3,867,240 A * | 2/1975 | Doerfling | ................ | B32B 27/10 428/80 |
| 4,247,586 A * | 1/1981 | Rochlin | ................... | B32B 3/266 156/252 |
| 5,591,289 A * | 1/1997 | Souders | ................ | B29C 70/345 156/308.2 |
| 5,754,664 A * | 5/1998 | Clark | ....................... | H04R 5/02 381/86 |
| 5,920,039 A * | 7/1999 | Cote | ...................... | H04R 1/025 181/150 |
| 6,324,294 B1 * | 11/2001 | Azima | ..................... | H04R 1/24 381/381 |

(Continued)

FOREIGN PATENT DOCUMENTS

| | | | | |
|---|---|---|---|---|
| DE | 102007042384 A1 * | 3/2009 | ............. | H04R 31/00 |
| DE | 102018132844 A1 * | 6/2020 | ............. | B32B 3/266 |

(Continued)

OTHER PUBLICATIONS

DE-102007042384-A1 translation of the description (Year: 2009).*

(Continued)

*Primary Examiner* — Michael W Hotchkiss
(74) *Attorney, Agent, or Firm* — McCoy Russell LLP

(57) ABSTRACT

Methods and systems are provided for a vehicle headliner. In one example, a method for forming the headliner includes forming a recess and an opening for a support structure in a base substrate layer of the headliner during heat treatment of the base substrate layer. The method further includes inserting the support structure in the recess and the opening and covering the base substrate layer with a skin. A positioning of the support structure within the base substrate layer allows an outline of the support structure to be undetectable through the skin by sight or touch.

18 Claims, 11 Drawing Sheets

(56) References Cited

U.S. PATENT DOCUMENTS

| | | | | |
|---|---|---|---|---|
| 6,356,641 | B1* | 3/2002 | Warnaka | H04R 5/02 381/86 |
| 6,456,722 | B1* | 9/2002 | Davey | B60R 11/0217 381/389 |
| 6,555,042 | B1* | 4/2003 | Mola | B60R 11/0223 264/258 |
| 6,612,640 | B2* | 9/2003 | Hock | B60Q 3/51 296/146.7 |
| 7,050,593 | B1* | 5/2006 | Emerling | H04R 5/02 181/161 |
| 7,058,193 | B2* | 6/2006 | Lane | B60R 11/0247 381/86 |
| 7,159,938 | B1* | 1/2007 | Shiraishi | B60R 11/0217 297/217.4 |
| 8,776,944 | B2* | 7/2014 | Ito | B60R 11/0223 381/86 |
| 9,308,874 | B2* | 4/2016 | Barna | B60R 11/02 |
| 9,344,786 | B2* | 5/2016 | Hook | H04R 1/086 |
| 10,672,327 | B1* | 6/2020 | Hinchman | B60Q 3/14 |
| 10,870,393 | B1* | 12/2020 | Forgette | B60Q 3/208 |
| 11,052,832 | B2* | 7/2021 | Mohr | B62D 33/06 |
| 11,115,742 | B2* | 9/2021 | Normann | B60R 11/0247 |
| 2001/0012369 | A1* | 8/2001 | Marquiss | H04R 5/02 381/86 |
| 2002/0195844 | A1* | 12/2002 | Hipwell | B60R 13/02 296/214 |
| 2004/0120536 | A1* | 6/2004 | McConnell | B60R 13/0212 381/86 |
| 2004/0204167 | A1* | 10/2004 | Lane | H04R 1/083 379/433.03 |
| 2006/0057349 | A1* | 3/2006 | Neitzke | B60R 13/02 428/221 |
| 2012/0213399 | A1* | 8/2012 | Li | H04R 1/086 381/365 |
| 2015/0279523 | A1* | 10/2015 | Oeuvrard | H01C 10/12 338/47 |
| 2017/0013339 | A1* | 1/2017 | Kim | H04R 1/04 |
| 2017/0142523 | A1* | 5/2017 | Schalla | H04R 1/025 |
| 2018/0281695 | A1* | 10/2018 | Arasuna | H04R 1/08 |
| 2019/0364351 | A1* | 11/2019 | Riemann | H04R 1/04 |
| 2020/0145743 | A1* | 5/2020 | Riemann | H04R 1/083 |
| 2020/0375055 | A1* | 11/2020 | Noda | H05K 1/181 |
| 2020/0382854 | A1* | 12/2020 | Normann | B60R 11/0247 |
| 2021/0204044 | A1* | 7/2021 | Marton | H04R 1/02 |
| 2021/0352390 | A1* | 11/2021 | Lee | H04R 17/00 |
| 2021/0363670 | A1* | 11/2021 | Abouraddy | D03D 15/54 |
| 2022/0063511 | A1* | 3/2022 | Hintz | B62C 29/043 |
| 2022/0097620 | A1* | 3/2022 | Katz | H04R 1/025 |
| 2022/0321985 | A1* | 10/2022 | Muraoka | H04R 1/083 |
| 2023/0249439 | A1* | 8/2023 | Mannheim Astete | H04R 7/045 428/138 |

FOREIGN PATENT DOCUMENTS

| | | | |
|---|---|---|---|
| FR | 2779398 A1 * | 12/1999 | B60R 11/0223 |
| WO | WO-2019234318 A1 * | 12/2019 | |

OTHER PUBLICATIONS

DE-102018132844-A1 translation of the description (Year: 2020).*
FR-2779398-A1 translation of the description (Year: 1999).*
WO2019234318A1 translation of the description (Year: 2019).*
"Automotive Interior Trim Production Equipment: IMG Thermoforming, Vacuum Forming and Laminating, Press Forming, Heat, Hot Air and Ultrasonic Joining Machinery," US Korea Hotlink Website, Available Online at https://www.uskoreahotlink.com/products/machinery/automotive-interior-trim-machinery/#Headliner-Line-Video, Available as Early as Aug. 14, 2018, 4 pages.

* cited by examiner

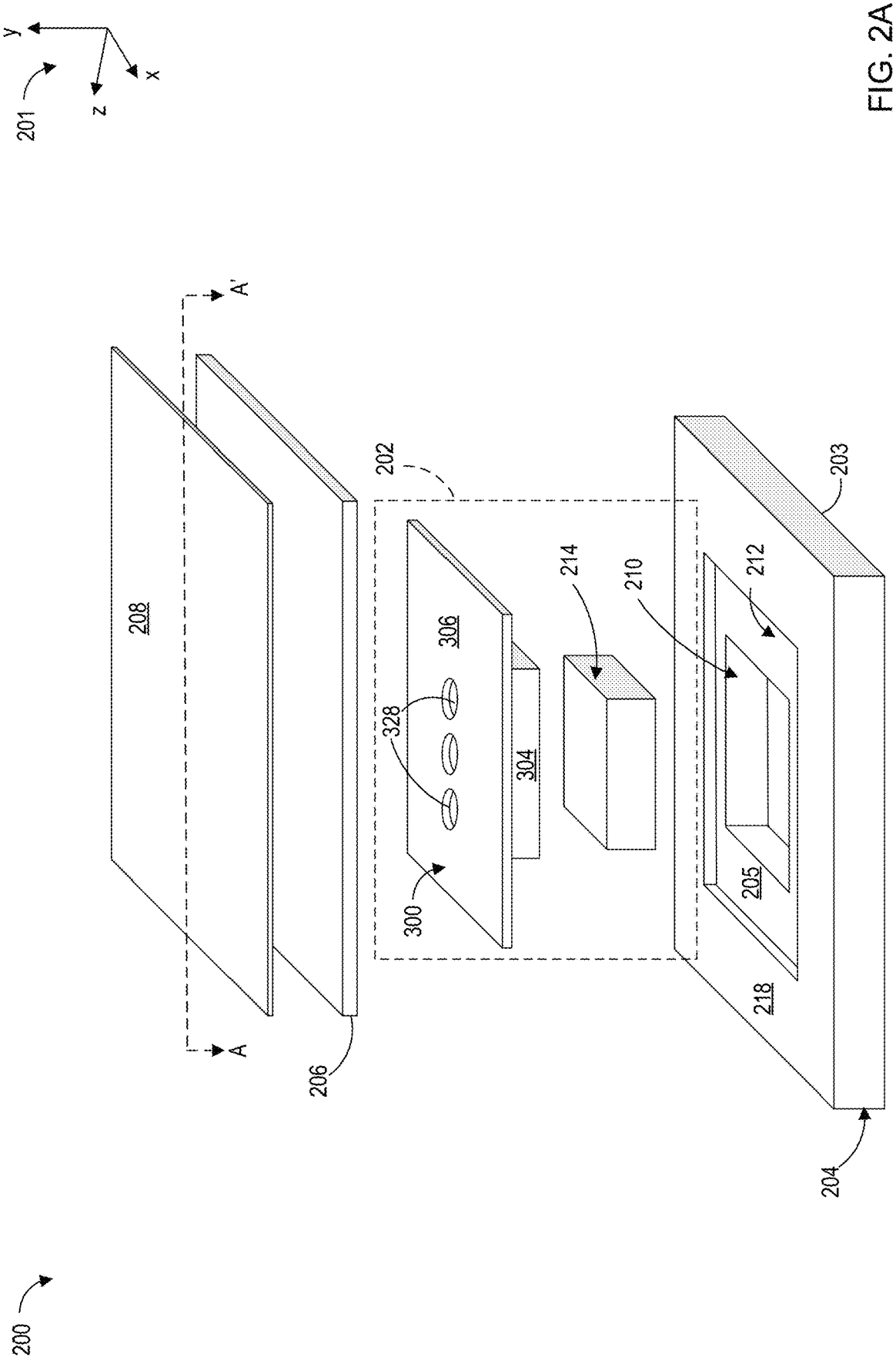

METHODS FOR FORMING A HIDDEN AUDIO ASSEMBLY

FIELD

The disclosure relates to a hidden audio assembly for a vehicle.

BACKGROUND

Modern vehicles may be configured with noise management systems to control a character of audible noise in a vehicle cabin. For example, it may be desirable to reduce intrusiveness of road noise, powertrain noise, vehicle noise, vibration, and harshness (NVH), etc. into the cabin. Furthermore, systems relying on audio frequency transmission and detection within the cabin, such as a hands-free telephony capability and identification of spoken commands via voice recognition, may be implemented in the vehicle.

Such systems may rely on a network of audio equipment, including microphones and speakers, installed in various locations in the vehicle cabin. For example, microphones may be located in a headliner of the vehicle, positioned in regions proximate to vehicle passengers to enable maximum reception of audio frequencies. The microphones may be embedded in the headliner and maintained in place by support structures, such as bezels and grills. The support structure may be visible, thereby disrupting a clean, uninterrupted visual aesthetic of the headliner.

SUMMARY

Embodiments are disclosed for a microphone assembly support structure. The support structure may be configured to be embedded in a region of a vehicle, such as a vehicle headliner, such that the microphone assembly is invisible from an exterior surface of the headliner. In one embodiment, a method for forming a headliner includes forming a recess and an opening for a support structure in a base substrate layer of the headliner during heat treatment of the base substrate layer. The support structure if inserted into the recess and the opening covered with a skin. A positioning of the support structure within the base substrate layer allows an outline of the support structure to be undetectable through the skin by sight or touch.

In another embodiment, a method for manufacturing a headliner for a vehicle includes forming an opening in a base substrate layer of the headliner by pressing a wall of a bracket into the base substrate layer until a top plate of the bracket is flush with a first surface of the base substrate layer. A portion of the base substrate layer enclosed by the wall of the bracket is removed and the base substrate layer is covered along the first surface with a skin.

In yet another embodiment, a method for forming a layered assembly with a hidden support structure includes embedding the support structure in a base substrate layer of the layered assembly and covering the support structure with a skin. The support structure is perforated to allow passage of acoustic signals covering the support structure with the skin allows the support structure to be invisible.

BRIEF DESCRIPTION OF THE DRAWINGS

The disclosure may be better understood from reading the following description of non-limiting embodiments, with reference to the attached drawings, wherein below:

FIG. 2A depicts an exploded view of a headliner assembly with an embedded bracket configured to house a microphone of the noise management system, in accordance with one or more embodiments of the present disclosure;

DETAILED DESCRIPTION

Figure 1:
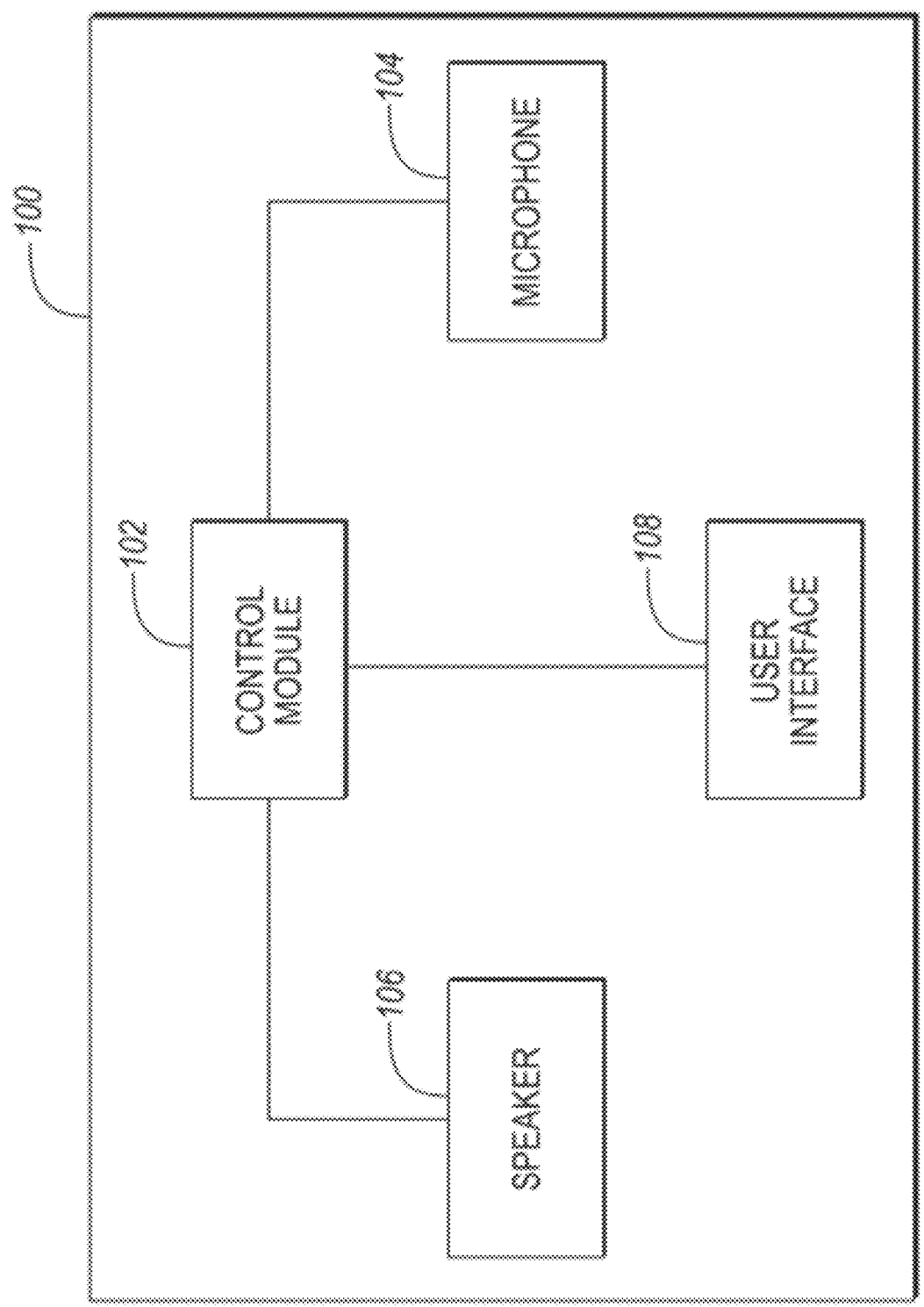
FIG. 1 depicts a noise management system within a vehicle environment, in accordance with one or more embodiments of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Modern vehicles may include a variety of sound management systems and devices that cooperate to manage an aural environment within a vehicle. For example, a vehicle may include a road noise cancellation (RNC) system that is configured to reduce the amount of road noise heard by vehicle occupants. Such systems may operate by receiving input from one or more microphones and/or sensors and outputting a signal to one or more loudspeakers that modifies the sound pattern. The systems can mask unwanted road and engine noise making the cabin seem quieter. Other applications may include hands-free communication systems and telephone applications. Other vehicle sound management systems may include active noise control (ANC) and in-car communication (ICC) systems.

These vehicle systems use one or more microphones to receive sound/noise input. The microphones may be installed at various locations within the vehicle. Sound propagates through air as a pressure wave. A source may generate a sound by causing a vibration in the air (or other medium). These vibrations then propagate from the source through the medium (e.g., air). A microphone may operate by receiving these pressure waves and converting the pressure waves into an electrical signal. To accomplish this, the microphone element may need to be exposed to the pressure wave.

Existing in-vehicle microphones receive the pressure wave through openings that expose the cabin air to the microphone elements. As an example, a microphone and/or sensor, e.g., a microphone assembly, may be installed in a headliner of the vehicle. The microphone assembly for installation in the headliner may include a visible A-surface grill that defines one or more openings. The A-surface may be that surface that is visible within the vehicle cabin. The microphone assembly may include a housing that attaches to the grill from a B-side of the headliner. The B-side may be that surface opposite the A-surface and is generally not visible within the cabin. These grills are generally visible within the cabin and may be aesthetically displeasing. In addition, the openings can allow dust and moisture intrusion into the microphone element which may cause reduced performance.

The increase in the number of headliner microphone grills has led to a demand for a microphone assembly that does not rely on an A-surface grill, i.e. an "invisible" microphone assembly. One challenge of integrating a microphone assembly into the headliner is the alignment of holes in the headliner to holes in the microphone assembly. Furthermore, it may be necessary to locate the microphone further away from the headliner which may lead to sealing problems and nonlinear microphone frequency response.

Embodiments disclosed herein include an invisible microphone assembly and insert support structure embedded into the headliner of a vehicle. A cut-out location for the microphone assembly is provided that may have a sufficiently large diameter to accommodate the microphone assembly. Embodiments include the insert support structure, which may be a bracket or a plate, integrated between the substrate and A-surface layers of the headliner, as described further below. It will be appreciated that while the assembly is described below with respect to a microphone assembly, the hidden configuration of the assembly may be applicable to a variety of audio devices, such as speakers.

FIG. 1 depicts a block diagram of a vehicle 100 that includes a control module 102. The control module 102 may include a microprocessor and memory to implement various features and functions. For example, the control module 102 may be part of an RNC system or an ANC system. The control module 102 may be part of an ICC system that manages in-vehicle communications. The control module 102 may also be configured as a sound processor to implement telematics features such as speech recognition and hands-free system operation.

The control module 102 may be electrically connected to one or more microphones 104. The microphones 104 may be in different positions within the vehicle 100. The microphones 104 may be configured to generate an electrical signal representing sound or noise at the position of the microphones 104. The control module 102 may be electrically connected to one or more speakers 106, e.g., loudspeakers 106. The loudspeakers 106 may be configured to generate sound based on signals received from the control module 102. The vehicle 100 may further include a user interface 108. In some examples, the user interface 108 may be a touch-screen display that can display content from the control module 102 and provide inputs (e.g., menu selections) to the control module 102. The user interface 108 may also include buttons and switches. The configuration and usage of the user interface 108 may depend on the purpose of the control module 102. The vehicle 100 may further include a headliner (not shown in FIG. 1). The headliner may be configured to line an interior of a roof of the vehicle 100. The headliner may be configured to provide noise and thermal insulation within the cabin of the vehicle. The headliner may also be configured for mounting various components. For example, lights, control panels, and microphones may be mounted to the headliner.

Embedding a concealed microphone in a headliner may face structural challenges. The space available for a microphone setup is often constrained due to arrangement of other components coupled to the headliner, and the setup may impede audio detection by the microphone. Ease of installation is also a concern given these constraints. The support assembly shown in FIGS. 2A-2B represents a setup that has relatively low space requirements with a straightforward installation, while also maintaining effective audio detection.

Figure 2B:
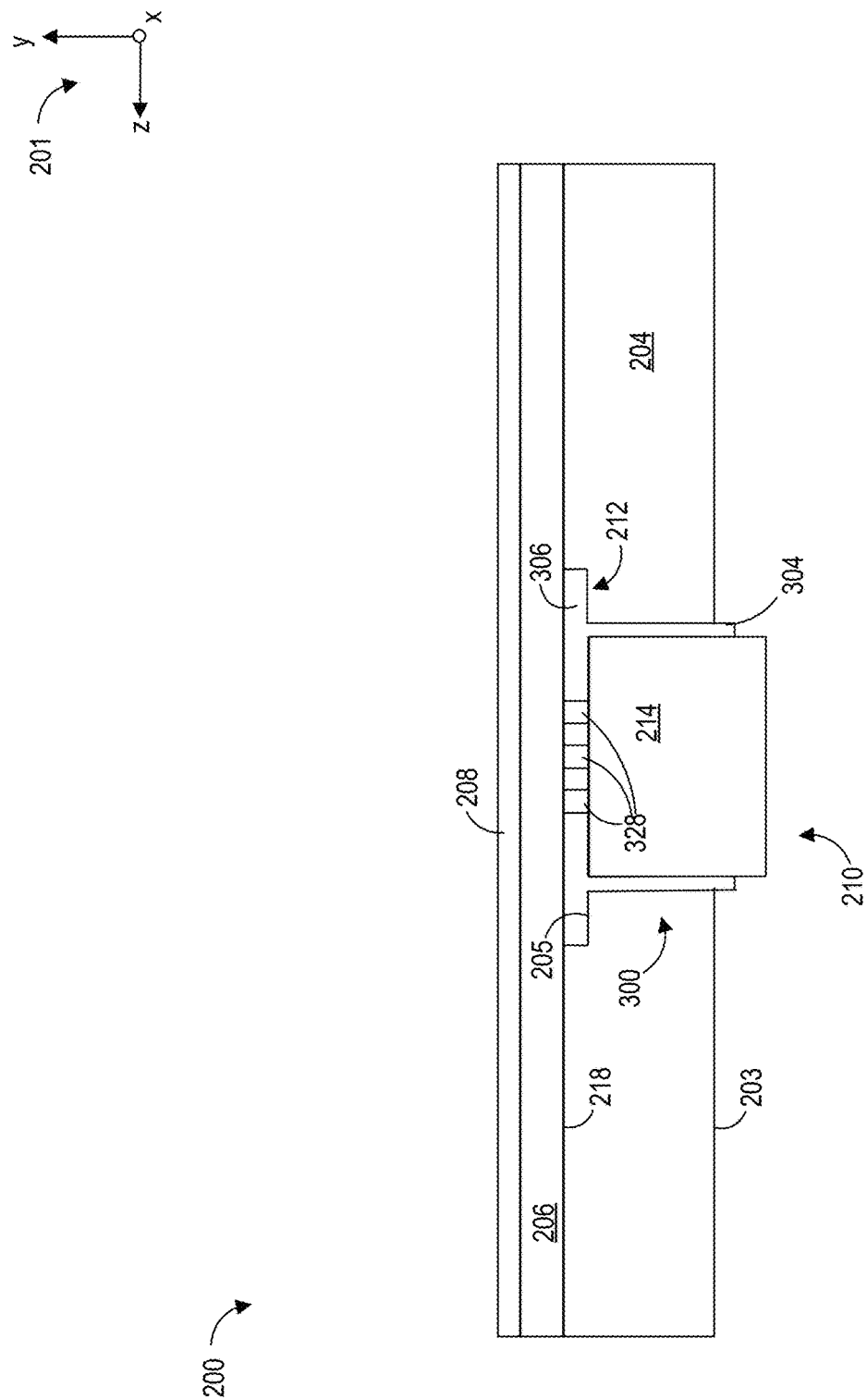
FIG. 2B shows a cross-section of the headliner assembly of FIG. 2A, in accordance with one or more embodiments of the present disclosure.

FIG. 2A depicts an exploded view of first example of a headliner assembly 200 that is configured to be installed in a vehicle headliner and FIG. 2B shows a cross-section of the headliner assembly 200, taken along line A-A' shown in FIG. 2A. A set of reference axes 201 are provided for comparison between views shown, indicating a y-axis, an x-axis and a z-axis. The headliner assembly 200 includes a microphone support assembly 202 embedded in layers of the headliner. While the example is directed toward installation in the vehicle headliner, the concepts and assemblies may also be applied to other areas of the cabin (e.g., side trim, dashboard, console). The vehicle headliner may be a multi-layer construction, e.g., a layered assembly, including a base substrate layer 204 that provides a backing and structural integrity of the headliner. The base substrate layer 204 may be constructed of a composite material having application-specific stiffness, strength, and insulating characteristics. For example, the base substrate layer 204 may be a relatively rigid, e.g., inflexible, foam and may also be referred to as a hard or core foam layer.

The base substrate layer 204 is covered by a middle foam layer 206, which is covered by a covering 208 which may form an A-side of the headliner assembly 200. A bottom surface 203 of the base substrate layer 204 may therefore be a B-side of the headliner assembly 200. Together, the middle foam layer 206 and the covering 208 form a skin of the headliner assembly 200. The middle foam layer 206 may be a soft, flexible foam and the covering 208 may be a material that allows acoustic waves, e.g., pressure waves, to penetrate through the material. For example, the covering 208 may be an acoustic fabric configured to be acoustically translucent. Each of the middle foam layer 206 and the covering 208 may be thinner than the base substrate layer 204, where a thickness of each layer is defined along the y-axis, and furthermore, a combined thickness of the middle foam layer 206 and the covering 208 may be less than a thickness of the base substrate layer 204. However, in other examples, the thickness of the base substrate layer 204 may be similar to or thinner than the skin.

The middle foam layer 206 may be bonded or otherwise secured to the covering 208 to form the skin of the headliner. The covering 208 may be similarly bonded or otherwise secured to the middle foam layer 206. For example, the covering 208 and the middle foam layer 206 may be bonded by flame lamination and applied to the base substrate layer 204 as a single layer. In some configurations, the skin may be stretch fit across the base substrate layer 204. It will be appreciated that the layers of the headliner may be coupled to one another by different techniques without departing from the scope of the present disclosure.

The headliner may be oriented in a vehicle cabin such that the covering 208 is proximate to the vehicle cabin, e.g., an upper face of the covering 208, with respect to the y-axis, faces the vehicle cabin, while the base substrate layer 204 is distal to the vehicle cabin. As such, the covering 208 may be configured to provide a desired aesthetic and/or texture to the headliner.

As described above, the microphone support assembly 202 may be embedded in the headliner layers. In one example, as shown in FIGS. 2A and 2B, the microphone support assembly 202 may include a bracket 300 which may be integrated into, e.g., circumferentially surrounded and recessed into the base substrate layer 204 to anchor a microphone housing 214, as shown in FIG. 2B. The bracket 300 may have an upper face 306, with respect to the y-axis, that is arranged flush with an upper surface 218 of the base substrate layer 204 when the bracket 300 is inserted into an opening or void 210 formed in the base substrate layer 204.

Dimensions, e.g., a width, height, and depth of the void 210 may be configured to receive the bracket 300 without any space between inner surfaces of the void 210 and outer surfaces of the bracket 300. As such, the base substrate layer 204 may have a sealing engagement with the bracket 300. The upper surface 218 of the base substrate layer 204 may also be adapted with a recess 212 with similar dimensions as the top surface of the bracket 300 to enable recessing of the top surface of the bracket 300 into the base substrate layer 204 to allow the upper face 306 of the bracket 300 to be continuous and co-planar, with the upper surface 218 of the base substrate layer 204, as shown in FIG. 2B. When inserted into the void 210, the bracket 300 is in face-sharing contact with a surface 205 of the recess 212. Further details of the bracket 300 are provided below with reference to FIGS. 3A-3C.

An example of a positioning of a bracket within a base substrate layer, as described above, is shown in FIG. 4. Therein, a bracket 400, which may be an alternate embodiment of the bracket 300 of FIGS. 2A-3C, has atop plate 402 recessed into a base substrate layer 404 of a headliner. The top plate 402 is flush with an upper surface, e.g., a surface of the base substrate layer 404 configured to be in face-sharing contact with a skin 406 of the headliner. Thus, when the skin 406 is covering the top plate 402, an outline of the top plate 402 is invisible.

Returning to FIGS. 2A and 2B, the microphone support assembly 202 may also include the microphone housing 214. The microphone housing 214 may be configured to enclose and provide structural support for a microphone/sensor (not shown). The microphone housing 214 may be formed of a plastic material, but is not limited as such. In one example, the microphone housing 214 may have a snap-fit engagement with the wall 304 of the bracket 300 to secure the microphone housing 214 to the bracket 300. Additionally, in some examples, foam tape may be used to form an acoustic seal between the microphone housing 214 and the bracket 300.

The microphone/sensor enclosed within the microphone housing 214 may include a connector that is configured to receive an electrical connector to transfer electrical signals from the microphone to another system (e.g., the control module 102 of FIG. 1). As an example, the microphone may utilize microelectromechanical systems (MEMS) technology and may be an integrated circuit/sensor assembly. The microphone may be configured to convert an acoustic wave at the sensor assembly into an electrical signal. For example, the microphone may detect audio signals within the vehicle cabin and relay the signal, as the electrical signal, to the control module for further processing.

Thus when assembled, the headliner assembly 200 may be formed of a bonded stack of the base substrate layer 204, the skin (e.g., the middle foam layer 206 and the covering 208) and the microphone support assembly 202 embedded therein. The bracket 300 may be inserted into the headliner assembly 200 such that the bracket 300 is arranged only in the base substrate layer 204, e.g., the bracket 300 does not protrude into the middle foam layer 206 of the skin. The skin may thereby have a smooth, uninterrupted appearance across a region where the microphone support assembly 202 is located.

Figure 5:
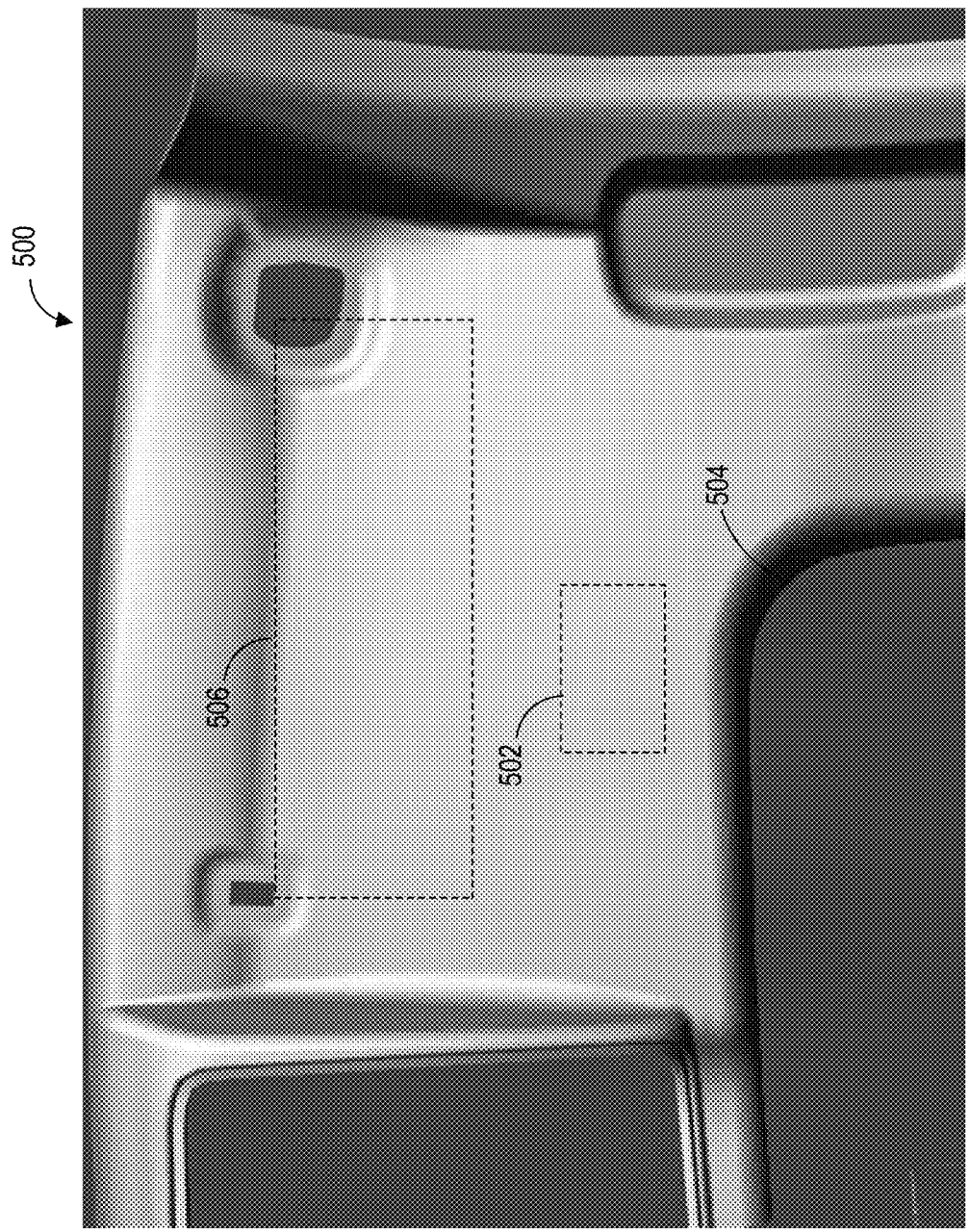
FIG. 5 shows a headliner of a vehicle with a hidden microphone support assembly, in accordance with one or more embodiments of the present disclosure.

For example, as shown in FIG. 5, a microphone support assembly may be installed in a flat, e.g., planar, region 502 of a headliner 500. In FIG. 5, the region 502 is positioned proximate to an opening 504 for a sunroof opening and spaced away from a region 506 where a sun visor may be located. Both the outline of the bracket and the location of the microphone/sensor are visually undetectable. The appearance of the microphone support assembly is concealed such that an occupant of the vehicle cabin may not be able to detect the presence of the microphone support assembly during inspection. In addition, the microphone is separated from the vehicle cabin only by a thickness of the skin and a thickness of a top plate of the insert support structure, thus minimizing impingement of audio signals by layers of the headliner.

Figure 3B:
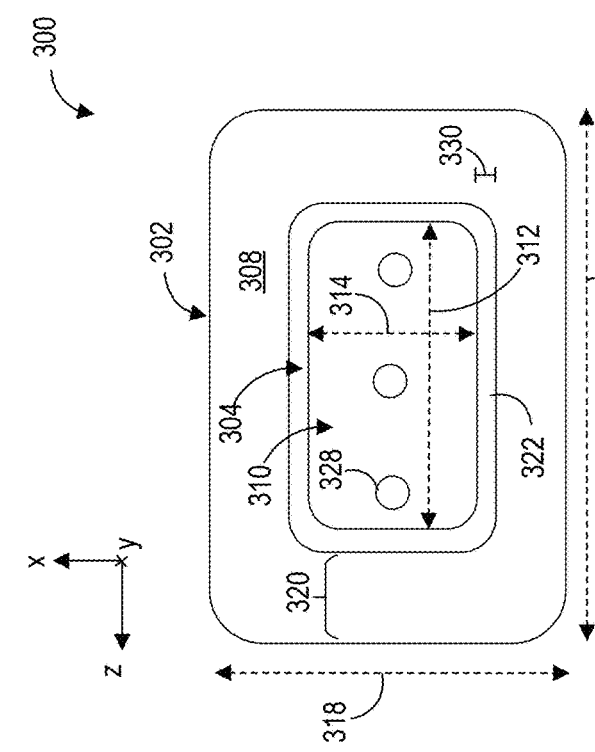
FIG. 3B shows a bottom view of the bracket shown in FIGS. 2A-2B, in accordance with one or more embodiments of the present disclosure.
Figure 3A:
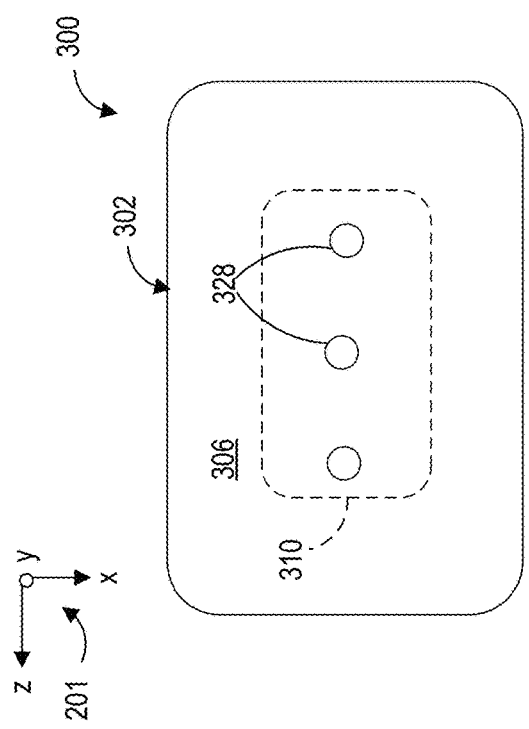
FIG. 3A shows a top view of the bracket shown in FIGS. 2A-2B, in accordance with one or more embodiments of the present disclosure.
Figure 3C:
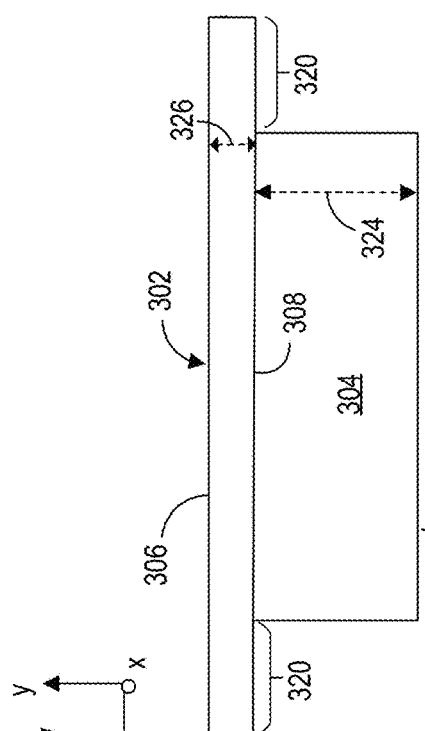
FIG. 3C shows a side view of the bracket shown in FIGS. 2A-2B, in accordance with one or more embodiments of the present disclosure.
Figure 4:
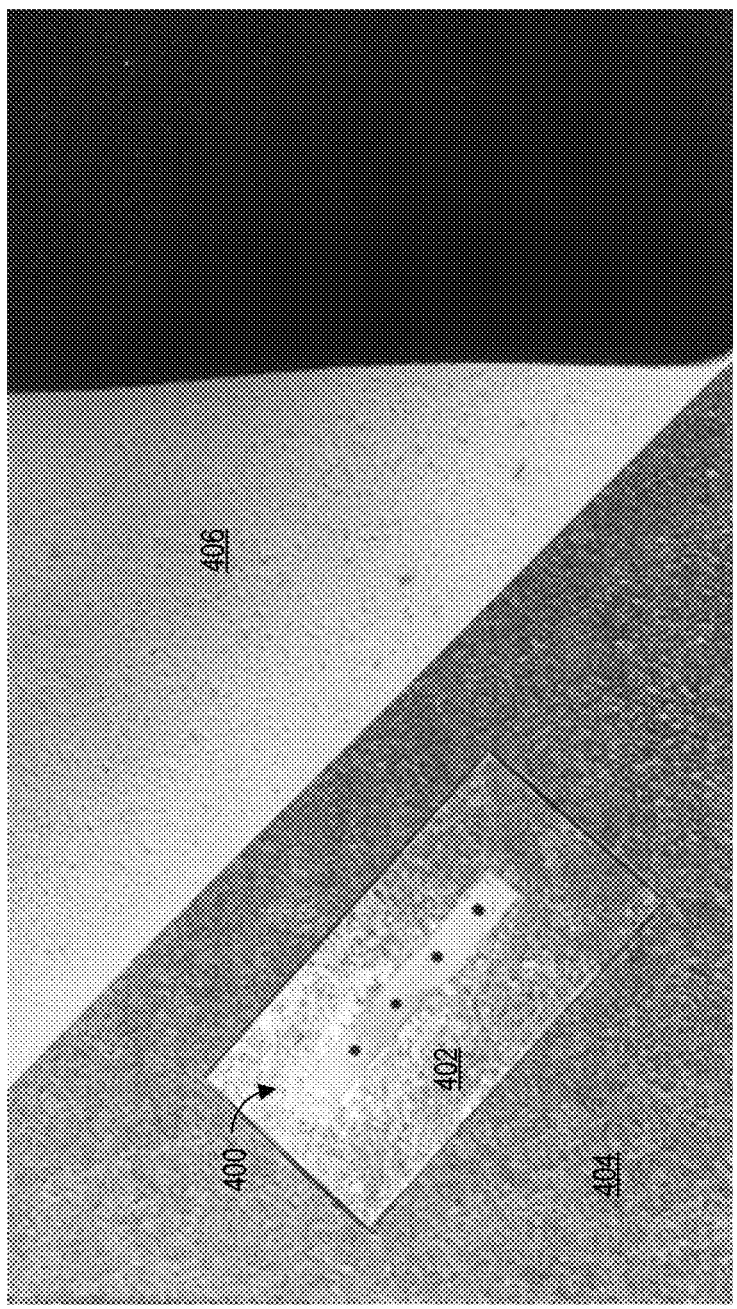
FIG. 4 shows a bracket embedded in a base substrate layer of a headliner, in accordance with one or more embodiments of the present disclosure.

The bracket 300 of FIGS. 2A-2B is shown in FIGS. 3A, 3B, and 3C from a top view, a bottom view and a side view, respectively, and will be discussed collectively. The bracket 300 may be a rectangular structure, e.g., rectangular along the x-z plane, of rigid material such as plastic or metal. The bracket 300 has a top plate 302 and a continuous wall 304 which may, in one example, be continuous with one another, forming a single, unitary structure. As another example, the top plate 302 and the wall 304 may be formed separately and attached to one another by a method such as welding. The top plate 302 and the wall 304 may be formed of a same or different material.

The top plate 302 may be a flat, solid plate with a rectangular outer geometry and the upper face 306 opposing a lower face 308. The upper face 306 of the top plate 302 may be in face-sharing contact with a surface of a middle foam layer of a skin, e.g., the middle foam layer 206 of FIG. 2. The wall 304 may be attached to the lower face 308 of the top plate 302, protruding perpendicularly away from the top plate 302 along the y-axis, as shown in FIG. 3C.

The wall 304 may be continuous, e.g., without breaks, and may form a rectangular shape when viewed along the y-axis, as shown in FIG. 3B. A central cavity 310 of the bracket 300 may be formed and enclosed by the wall 304 and may be configured to house a microphone, as described above.

A length 312, as defined along the z-axis, and a width 314, as defined along the x-axis, of the central cavity 310 may each be smaller than a length 316 and a width 318 of the top plate 302, as shown in FIG. 3B. As such, the top plate 302 has an outer extension 320 that continuously frames the wall 304 when viewed along the y-axis. The outer extension 320 may be an overhang of the top plate 302 that extends along the x-z plane beyond the length 312 and the width 314 of the central cavity 310, along all sides of the top plate 302. In one example, the outer extension 320 may be sufficiently large to allow the outer extension 320 to be adhered to the base substrate layer without becoming visible through the skin. As an example, the outer extension 320 may extend a distance of 1 cm around the wall 304. However, in other examples, a size of the outer extension 320 may be reduced if an additional bracket or attachment, such as a ring attached to a surface of the wall 304 were positioned at the B-side of the base substrate layer to brace the bracket 300 and maintain the bracket 300 in place. The lower face 308 of the top plate 302 may be in face-sharing contact along the outer extension 320 with a surface of the base substrate layer at the recess when the bracket 300 is embedded in the base substrate layer. A region of the lower face 308 enclosed by the wall 304 may be in contact with the microphone/sensor.

A bottom edge 322 of the wall 304 and of the bracket 300 may be flat and parallel with the top plate 302 along the x-z plane, as shown in FIG. 3C. A height 324 of the wall 304 may be greater than a height 326 of the top plate 302. However, in other examples, the height 324 of the wall 304 may vary relative to the height 326 of the top plate 302. For example, the height 324 of the wall 304 may be increased or decreased based on a thickness of a base substrate layer, e.g., the base substrate layer 204 of FIG. 2, of the headliner while the height 326 of the top plate 302 may depend on a material used to form the top plate 302. The recessing of the top plate 302 into the base substrate layer 204, however, may constrain the height of the top plate 302 to be less than the thickness of the base substrate layer 204. In other examples, the height of the top plate 302 may be not constrained if a shape of the base substrate layer 204 is molded to accommodate the top plate 302 by forming a recessed pocket.

A thickness 330 of the wall 304, as shown in FIG. 3B, may vary depending on a material strength of the bracket 300 and a process of forming the void in the base substrate layer (e.g., whether the void is formed prior to inserting the bracket 300 or vice versa). For example, the thickness 330 of the wall 304 may be 0.5 mm if formed from metal or 2 mm if formed from plastic. The thickness 330 may be optimized to allow the wall 304 to slice easily into the base substrate layer when the base substrate layer is heated and softened while providing sufficient structural support to the microphone coupled thereto. In other words, the thickness 330 of the wall 304 may be a balance between a cutting ability and stabilizing capability. In one example, the thickness 330 of the wall 304 may be uniform throughout the wall. In another example, the thickness 330 of the wall 304 may taper to become thinner at the bottom edge 322, similar to a cookie cutter, to allow the bottom edge 322 to cut into the base substrate layer with minimal resistance while maintaining a robustness of the wall 304.

Furthermore, while the bracket 300 is depicted with an overall rectangular geometry, it will be appreciated that the bracket shown herein is a non-limiting example. The overall shape and dimensions of the bracket 300 and the central cavity 310 may be varied to facilitate installation of the bracket with differently shaped and sized microphone assemblies. For example, the bracket may have an outer geometry that is elliptical, square, quadrilateral, etc. As another example, a size of the central cavity 310, relative to the top plate 302, may vary, thus modifying a size of the outer extension 320 of the top plate 302. The configuration may also be installed in other areas of the vehicle cabin, as described above.

The top plate 302 may also include one or more openings 328 extending entirely through the height 326, e.g., a thickness, of the top plate 302. In other words, the openings 328 may be through-holes. The openings 328 may be aligned with the central cavity 310 of the bracket 300, e.g., along the y-axis, and therefore aligned with a microphone assembly (e.g., a microphone, a sensor, etc.) housed in the central cavity 310. The openings 328 may be formed in the top plate 302 of the bracket 300 before or after insertion of the bracket 300 into the base substrate layer.

In one example, as shown in FIGS. 3A and 3B, the openings 328 may be three circular holes centered within the top plate 302 and aligned along the z-axis. In one example, a diameter of each of the openings 328 may be between 1-4 mm. The openings 328 may allow unimpeded passage of sound through the top plate 302 while maximizing an unperforated portion of the top plate 302. In this way, the top plate 302 may have sufficient surface area to provide structural support to the skin to circumvent sagging of the skin across the top plate 302 of the bracket 300. As such, the bracket 300 allows the headliner assembly 200 to be configured in a hidden arrangement, where both an outline of the bracket 300 and the microphone are invisible. While three circular openings are depicted in FIGS. 3A and 3B, various shapes, quantities, arrangements, and sizes of the openings 328 are possible.

Figure 6:
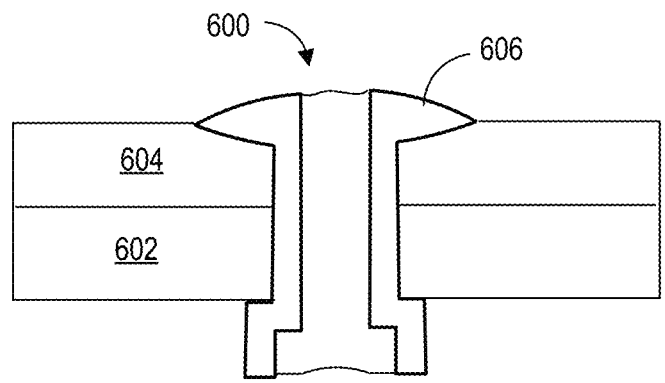
FIG. 6 shows an opening extending through both a top plate of a bracket and a skin covering the top plate where the opening is adapted with a rivet, in accordance with one or more embodiments of the present disclosure.

In some examples, the openings 328 may be extended through the skin. As shown in FIG. 6, an opening 600, which may be an embodiment of one of the openings 328 of FIGS. 3A-3B, may be formed through both a top plate 602 of a bracket, e.g., the bracket 300 of FIGS. 2-3C, and a skin 604 in face-sharing contact with the top plate 602. The opening 600 may be surrounded by a rivet 606 to maintain an alignment of the opening 600 through the top plate 602 and the skin 604. The rivet 606 may protrude from surfaces of both the skin 604 and the top plate 602. A protruding portion of the rivet 606 from a surface of the skin 604 facing into a vehicle cabin may be visible. As such, the rivet 606 may be positioned in a region of the skin 604 configured with a graphic or a texture to camouflage the rivet 606. As another example, a visibility of the rivet 606 may be obscured by positioning the rivet 606 behind a structure in the headliner, e.g., adjacent to a light. In some examples, a diameter of the opening 600, and hence a diameter of the rivet 606, may be sufficiently small to be difficult to detect visually.

In some examples, the bracket may also be used for a semi-hidden arrangement of an audio device, such as a microphone assembly. More specifically, in instances where the skin is formed of a thicker, more durable material, additional treatment of the skin may be demanded. For example, the thicker skin may not allow unimpeded passage of acoustic signals therethrough and may be perforated to offset an adverse effect on sound transmission to the microphone assembly enclosed within the headliner assembly. As a result, the microphone assembly may be invisible but an outline of the microphone assembly may be indicated by visible perforations along the skin of the headliner. In some examples, the visible perforations may be configured with rivets, such as the rivet 606 shown in FIG. 6.

In such instances, as well as when a thinner, acoustically translucent skin is applied to the base substrate layer, the headliner assembly may include a microphone support assembly with only a top plate, e.g., similar to the top plate 302 of the bracket 300 of FIG. 3, and without a wall (e.g., the wall 304). A second example of a headliner assembly 1000 for a semi-hidden configuration of a microphone support assembly 1002 is shown in an exploded view in FIG. 10A and in a cross-sectional view in FIG. 10B, the cross-section taken along line B-B' of FIG. 10A. The headliner assembly 1000 includes the base substrate layer 204, void 210, recess 212, microphone housing 214 of FIG. 2 which will not be re-introduced. The microphone support assembly 1002 includes a top plate 1010, in addition to the microphone housing 214.

The top plate 1010 may be formed of a thin metal or plastic sheet configured to be nested in the recess 212 of the base substrate layer 204 and may have dimensions (e.g., a thickness, width, and length), similar to dimensions of the recess 212. As shown in FIG. 2B, when the headliner assembly 1000 is assembled, an upper face 1008 of the top plate 1010 may be flush with the upper surface 218 of the base substrate layer 204. A recessing of the top plate 1010 into the base substrate layer 204 positions the top plate 1010 such that the top plate 1010 does not protrude into a skin 1012 of the headliner assembly 1000.

The skin 1012, in one example may be the skin shown in FIGS. 2A-2B, including a middle foam layer bonded to a covering (e.g., the middle foam layer 206 and the covering 208 of FIGS. 2A-2B). As another example, the skin may be a layer of a thicker material, such as leather, where the thicker material may or may not be bonded to the middle foam layer. When the skin 1012 is formed of the thicker material, acoustic signals may not readily penetrate through the skin 1012, as described above. In such instances, the skin 1012 and the top plate 1010 may be perforated together to form perforations 1014, or through-holes 1014 that extend entirely through the skin 1012 and the top plate 1010. The through-holes 1014 may be sufficiently small in diameter to maintain the structural support provided by the top plate 1010. In addition, in some examples, a graphic, such as a logo, may be added to the skin 1012 across the top plate 1010 to provide a desired aesthetic or accessory structures, such as the rivet 606 of FIG. 6 may be applied to at least some of the through-holes 1014.

The through-holes 1014 in the top plate 1010 may form a grille for the microphone/sensor enclosed in the microphone housing 214. A configuration of the through-holes 1014, e.g., a layout and a quantity, may therefore vary from the configuration shown in FIGS. 10A-10B depending on the microphone/sensor. Furthermore, when the skin 1012 is formed from the thinner covering bonded to the middle foam layer to foam an acoustically translucent skin, the perforations 1014 may extend only through the top plate 1010 and not the skin 1012.

In some examples, the microphone support assembly 1002 may also include an optional B-side bracket 1004. Whereas the bracket 300 of FIGS. 2A-3 may be an A-side bracket with the top plate closer to the A-side of the headliner assembly than the B-side, the B-side bracket 1004 of FIGS. 10A-10B may have a bottom plate 1003 that abuts the bottom surface 203 of the base substrate layer 204. A continuous wall 1005 is coupled to the bottom plate 1003 and extends upwards and perpendicularly from the bottom plate 1003. Furthermore, the B-side bracket 1004 has a central opening 1006 that extends through the bottom plate 1003, as shown in FIG. 10B. As described above, use of a rectangular bracket is for illustrative purposes only and other geometries are possible.

A height of the bracket 1004, as defined along the y-axis, may be similar to a distance between the bottom surface 203 of the base substrate layer and the surface 205 of the recess 212. When the headliner assembly 1000 is fully assembled, the wall 1005 of the bracket 1004 may be entirely enclosed within the void 210 and the bracket 1004 may be hot-glued to maintain a position of the bracket 1004 within the base substrate layer 204. The top plate 1010 may provide structural support to the skin 1012 across an area occupied by the microphone support assembly 1002 which may otherwise cause sagging and loss of tautness across the central opening 1006 of the bracket 1004.

Acoustic signal transmission through the semi-hidden or hidden headliner assembly 1000 may be enabled by the through-holes 1014. When only the top plate 1010 is used, the void 210 may be cut in the base substrate layer 204 such that the void 210 is aligned with the recess 212. The microphone housing 214 is inserted through the void 210 and may be directly adhered to the top plate 1010. Additionally or alternatively, the microphone housing 214 may be inserted into the central opening 1006 of the bracket 1004 and attached to the bracket 1004 by fasteners, clips, etc., when the bracket 1004 is included.

Figure 7:
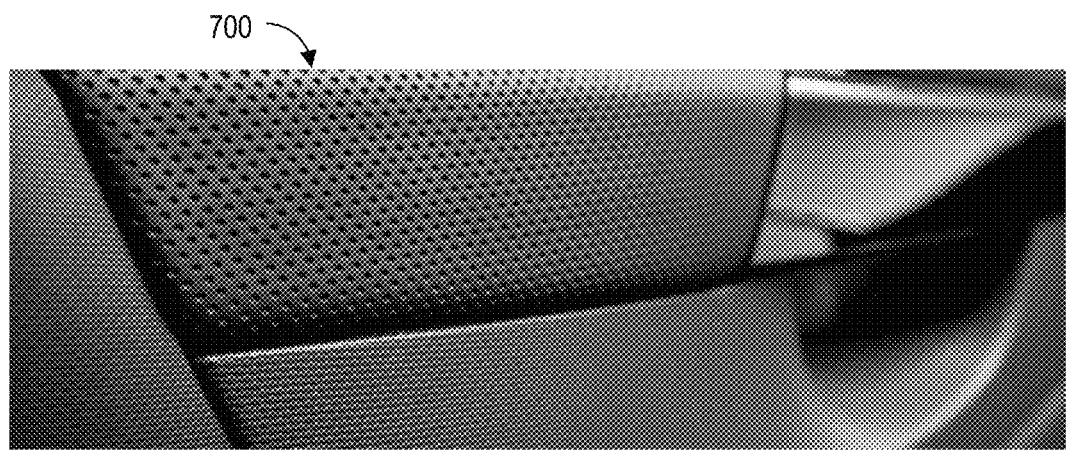
FIG. 7 shows an interior vehicle door panel configured with a semi-hidden microphone support assembly, in accordance with one or more embodiments of the present disclosure.

An example of a semi-hidden arrangement of a microphone is depicted in FIG. 7. Therein, an interior panel 700 of a vehicle door is shown. The interior panel 700 includes an outer layer of leather covering a metal sheet, both of which are perforated in a uniform manner. A microphone support assembly is hidden by the outer layer of leather and the metal sheet. It will be appreciated that a similar configuration may be used in a vehicle headliner.

Figure 8:
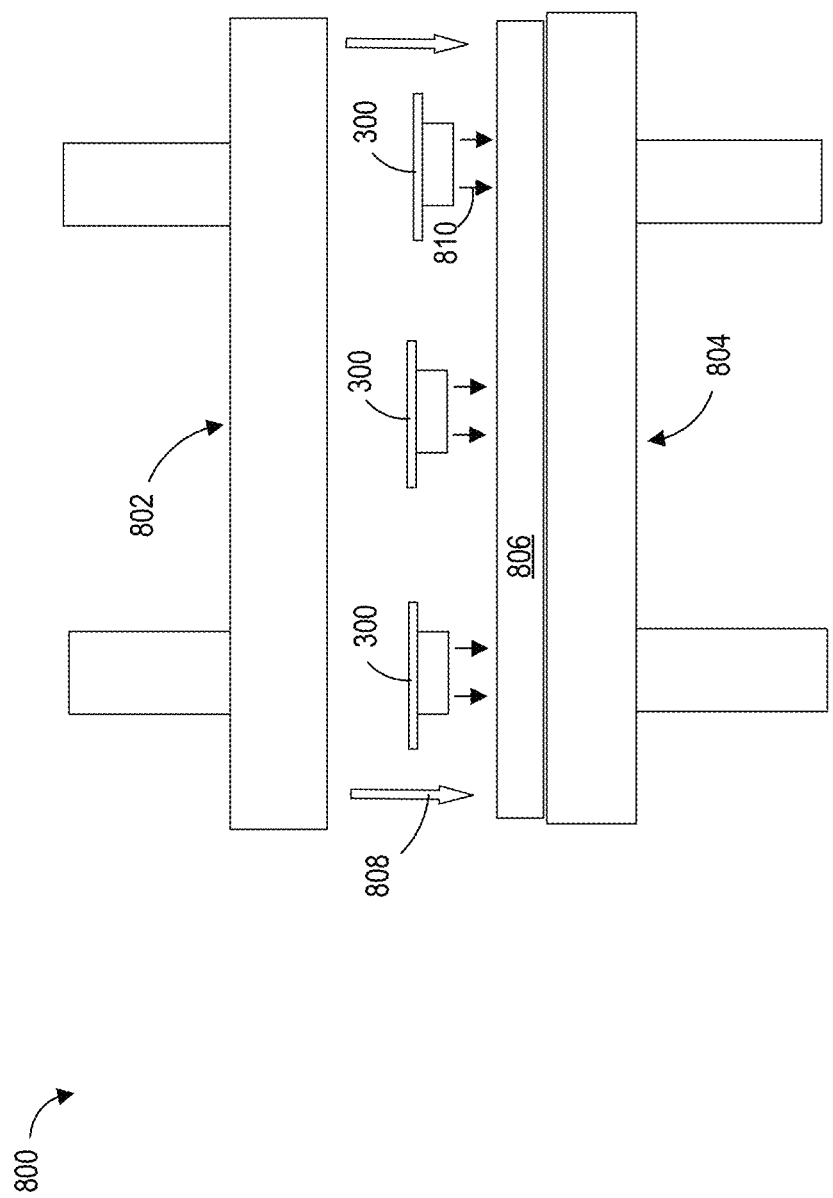
FIG. 8 shows a schematic of a hot form press used to treat a base substrate layer of headliner, in accordance with one or more embodiments of the present disclosure.
Figure 10A:
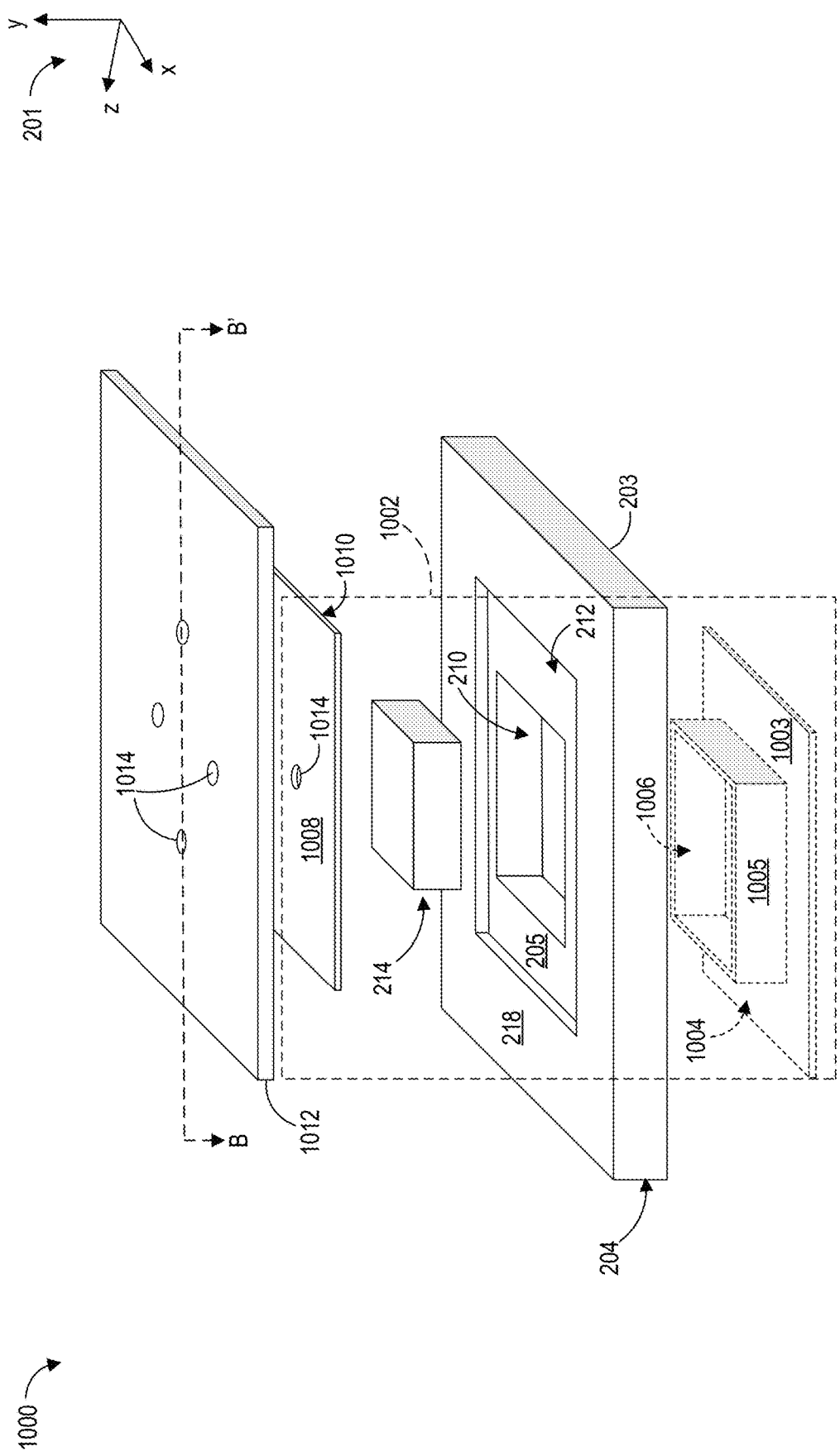
FIG. 10A shows an exploded view of a headliner assembly with a semi-hidden microphone support assembly in accordance with one or more embodiments of the present disclosure.
Figure 10B:
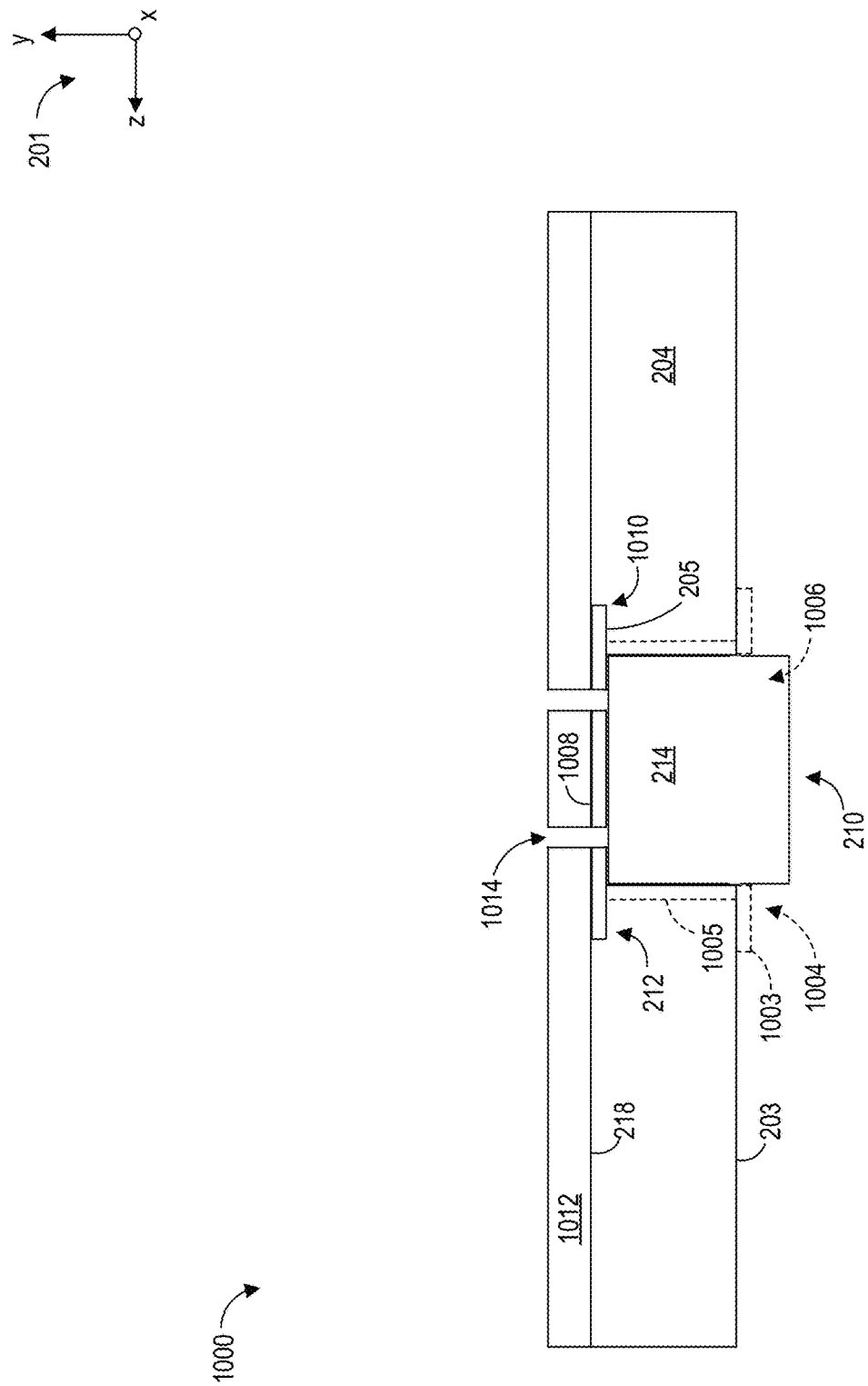
FIG. 10B shows a cross-section of the headliner assembly of FIG. 10B, in accordance with one or more embodiments of the present disclosure.

One or more insert support structures, such as the bracket 300 of FIGS. 2A-3C or the top plate 1010 of FIGS. 10A-10B, may be inserted into a base substrate layer of a headliner during a heat treatment of the base substrate layer. For example, as shown in a schematic in FIG. 8, a hot form press 800 may be used to heat and mold the headliner into a suitable shape for installation in a vehicle cabin. The hot form press 800 may have an upper press 802 and lower press 804 with heating elements to heat a base substrate layer 806. The upper press 802 and the lower press 804 may also include matching halves of a mold. Upon heating, the base substrate layer 806 may soften and conform to a shape of the mold when the upper press 802 is lowered to come into contact with the base substrate layer 806, as indicated by arrows 808.

The softening of the base substrate layer 806 may also allow one or more of the bracket 300 to be pressed into the base substrate layer 806, as indicated by arrows 810. The wall of the bracket 300, e.g., the wall 304 of FIGS. 2 and 3B-3C, may be of a suitable thickness to cut through the base substrate layer 806 readily without causing deformation of the bracket 300. The bracket 300 may be inserted into the base substrate layer 806 by placing the bottom edge of the bracket 300 (e.g., the bottom edge 322 of FIGS. 3B-3C) against an upper surface of the base substrate layer 806 and applying force until the upper face (e.g., upper face 306) of the bracket 300 is flush with the upper surface of the base substrate layer 806. Alternatively, if a top plate, such as the top plate 1010 of FIGS. 10A-10B is used instead of the bracket 300, the top plate is pressed into the base substrate layer 806 until the upper face (e.g., the upper face 1008) of the top plate is flush with the upper surface of the base substrate layer 806. A portion of the base substrate layer may be removed from the central cavity/opening of the bracket, thereby providing a space for housing a microphone assembly (e.g., a microphone, a sensor, connectors, etc.). The microphone assembly may be coupled to the bracket through the B-side of the headliner.

The bracket may be inserted into the heated base substrate layer while the base substrate layer is molded to a desired shape. Insertion of the bracket may be performed by adapting the hot form press 800 with retaining structures, such as clips or fingers at the upper press 802. The lower press 804 may have recesses to assist in material displacement in at the base substrate layer 806 caused by insertion of the bracket.

Figure 9:
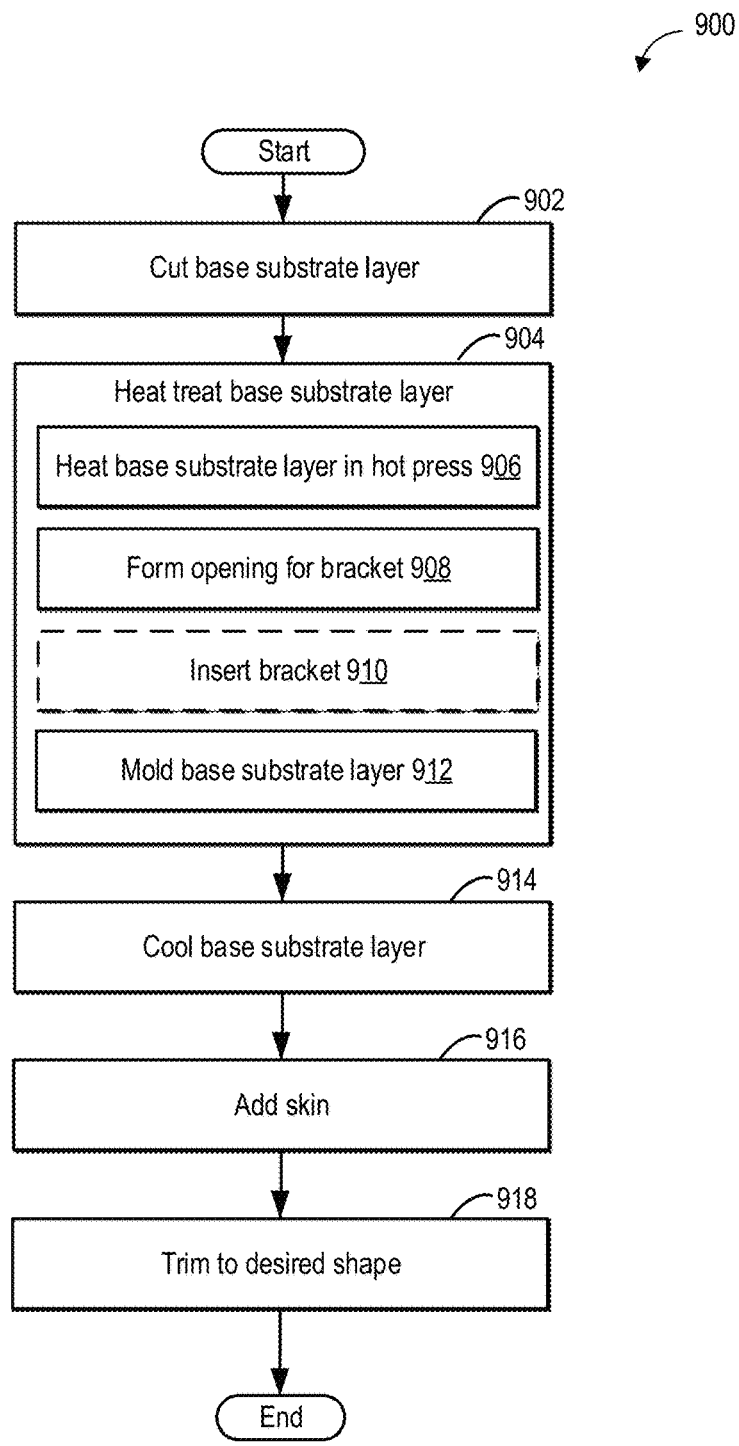
FIG. 9 shows a method for forming a headliner assembly with a hidden bracket for a microphone support assembly, in accordance with one or more embodiments of the present disclosure.

An example of a method 900 for forming a headliner assembly with one or more audio assemblies is shown in FIG. 9. The headliner assembly may, in one example, be the headliner assembly 200 of FIGS. 2A-2B, including a base substrate layer coupled to a skin, the skin formed of a middle foam layer and a covering. The base substrate layer may be formed of a more rigid material than the skin. An insert support structure, such as the bracket 300 of FIGS. 2A-3C or the top plate 1010 of FIGS. 10A-10B, may be inserted and embedded into the headliner assembly during method 900 to enable subsequent coupling of a microphone assembly to a central cavity or central opening of the bracket or void in the base substrate layer. Method 900 may be implemented at a headliner manufacturing plant or system, including a series of instrument and machines configured to perform various processing steps during formation of the headliner assembly. Operation of the instruments and machines may be controlled by a system controller, e.g., when the method is configured as an automated method, or by one or more operators.

At 902, the method includes cutting the base substrate layer to desired dimensions. For example, the base substrate layer may be initially formed as a sheet and may be trimmed to dimensions similar to a ceiling of a vehicle cabin. The method includes processing the base substrate layer via a heat treatment at 904. Heat treating the base substrate layer includes, at 906, heating the cut base substrate layer in a hot form press, such as the hot form press 800 of FIG. 8. For example, the base substrate layer may be placed on a lower press of the hot form press and heated to a target temperature. Heating the base substrate layer to the target temperature may cause the rigid material of the base substrate layer to soften and become malleable.

The heat treatment of the base substrate layer further includes, at 908, forming an opening or void in the base substrate layer for inserting the bracket. Forming the void may, in one example, include pressing a bottom edge of a wall of the bracket into a first face of the base substrate layer such that the wall of the bracket cuts into the base substrate layer from the first face through an entire thickness of the base substrate layer to a second, opposite face. For example, the bottom edge of the wall may become flush with the second face of the base substrate layer. As such, a height of the bracket may be configured to be similar to or less than the thickness of the base substrate layer.

Upon pressing the bracket into the base substrate layer to allow the wall to cut into the base substrate layer, a portion of the base substrate layer enclosed within the wall may be removed mechanically or by vacuum through a space in a lower press of the hot form press.

Alternatively, when the top plate is used, the void may be cut into the base of substrate layer at the hot form press using a cutting tool. The cut portion of the base substrate layer may be similarly removed either mechanically or by vacuum. In some examples, a B-side bracket, such as the B-side bracket 1004 of FIGS. 10A-10B, may be inserted into the void and adhered to the base substrate layer, e.g., by hot-glue.

The insert support structure may be pressed until a top plate of the bracket/the top plate is flush with the first face of the base substrate layer, e.g., an upper face of the top plate is co-planar and continuous with the first face of the base substrate layer, thus forming a recess in the base substrate layer at the first face in which the top plate is nested. A portion of the base substrate layer enclosed by the wall, e.g., the portion of the base substrate layer within a central cavity of the bracket when the bracket is the bracket 300 of FIGS. 2A-3C, is removed, thereby forming the void.

Heat treatment of the base substrate layer further includes molding the base substrate layer at 912. The heated base substrate layer, with the embedded bracket, may be stamped at the hot form press to mold the base substrate layer to a desired geometry to match contours of the vehicle cabin ceiling.

It will be appreciated that while insertion of a single insert support structure is described above, one or more insert support structures may be inserted and embedded into the base substrate layer. The insert support structures may be arranged in target regions of the headliner, configured to maximize reception of audio frequencies. For example, the insert support structures may be positioned behind sun visors above a windshield of the vehicle or adjacent to passengers in rear seats of the vehicle.

In another example, the void in the base substrate layer may instead be formed by cutting the recess and the void prior to insertion of the insert support structure, e.g., pre-cut, during heat treatment of the base substrate layer once the base substrate layer is heated (e.g., 906). For example, the base substrate layer is molded and the opening for the insert support structure is cut (e.g., 912 and 908) first. The mold may then be opened and/or the base substrate layer transferred to another similar mold where the insert support structure is inserted (e.g., 910). A final molding of the base substrate layer may be performed which presses the insert support structure flush with the base substrate layer (e.g., 912 is repeated).

At 914, the method includes removing the molded base substrate layer from the hot form press and cooling the base substrate layer. In one example, the base substrate layer may be air-cooled. However, other cooling methods may be used. Upon cooling, the base substrate layer may regain sufficient rigidity to allow easier handling and manipulation. A position of the insert support structure may be maintained as a result of the hot pressing of the insert support structure against a surface of the recess (e.g., adherence between the outer extension 320 of the bracket 300 and the surface 205 of the recess as shown in FIGS. 2A-2B) or by molding small fingers 321 along the outer extension of the bracket/face of the top plate. As another example, the insert support structure may be held in place by a pre-applied adhesive which may be activated by heat. Furthermore, as described above, the B-side bracket may be installed via a snap-fit engagement with the insert support structure. An adhesive may additionally be used to secure the position of the B-side bracket to circumvent shifting and/or sliding of the B-side bracket. Techniques for maintaining the position of the insert support structure may be applied before or after application of the skin.

The skin is added to the cooled base substrate layer at 916 as an uninterrupted, e.g., without holes, outer layer of the headliner assembly across the insert support structure. A profile of the skin across the top plate of the insert support structure may be smooth and without protrusions such that an outline of the top plate is not discernible by sight or touch. The covering and the middle foam layer may be coupled to one another prior to adhesion to the base substrate layer to form the skin. The skin may be coupled to the base substrate layer with the middle foam layer facing the base substrate layer. Once the skin is coupled to the base substrate layer, the skin and the top plate/the top plate of the bracket may be perforated together if the perforations are to be through-holes for a semi-hidden configuration of the headliner assembly. However, if the microphone assembly is to be hidden, the top plate/the top plate of the bracket may be already perforated prior to insertion in the base substrate layer.

At 918, the headliner assembly, e.g., a laminated stack formed by the base substrate layer and the skin with the insert support structure embedded therein, may be trimmed to a final desired shape matching a geometry of the vehicle cabin ceiling. For example, excess skin may be trimmed to follow an outer edge of the base substrate layer. The method ends and the headliner assembly may be further processed at another facility or processing system to install a microphone in the central cavity of the insert support structure.

By utilizing an insert support structure embedded into a base substrate layer of a headliner assembly, a headliner assembly with one or more hidden audio assemblies is provided. The insert support structure may be entirely hidden by a skin of the headliner assembly such that the skin is free of protrusions and read-through lines, yielding an audio assembly that is undetectable by sight or touch. A demand for aligning a microphone and sensor of the audio assembly with holes in the headliner is precluded, allowing easier installation of array microphones and sensors. The insert support structure reduces an unsupported area of the skin extending across the audio assembly, thus maintaining a smooth, continuous aesthetic of the headliner. An adverse effect of the skin on acoustic signal transmission to the audio assembly is lessened. The use of the insert support structure enables efficient audio assembly installation and arrangement of the audio assembly in tight spaces and reduces rear noise rejection by minimizing noise leakage through a rear side (e.g., a B-side) of the headliner assembly. Furthermore, the audio assembly is located closer to an interior of the vehicle compared to conventional methods.

The description of embodiments has been presented for purposes of illustration and description. Suitable modifications and variations to the embodiments may be performed in light of the above description or may be acquired from practicing the methods. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure also provides support for a method for forming a headliner, comprising: forming a recess and an opening for a support structure in a base substrate layer of the headliner during heat treatment of the base substrate layer, inserting the support structure in the recess and the opening, and covering the base substrate layer with a skin, wherein a positioning of the support structure within the base substrate layer allows an outline of the support structure to be undetectable through the skin by sight or touch. In a first example of the method, forming the opening for the support structure includes pressing the support structure into the base substrate layer and allowing a wall of the support structure to cut through a thickness of the base substrate layer until a top plate of the support structure, the top plate arranged perpendicular to the wall, is flush with a surface of the base substrate layer configured to be coupled to the skin. In a second example of the method, optionally including the first example, forming the recess includes pressing a top plate of the support structure, the top plate arranged co-planar with the skin and the base substrate layer, into the base substrate layer until an upper face of the top plate is flush with a surface of the base substrate layer configured to be coupled to the skin. In a third example of the method, optionally including the first and second examples, forming the opening for the support structure further includes removing a portion of the base substrate layer between the top plate and a B-side of the headliner to form a space to accommodate insertion of an audio assembly. In a fourth example of the method, optionally including the first through third examples, covering the base substrate layer with the skin enables the audio assembly to be visually undetectable through the skin. In a fifth example of the method, optionally including the first through fourth examples, inserting the support structure in the recess and the opening includes separating the audio assembly from an interior of a vehicle cabin by a thickness of the skin and a thickness of the top plate. In a sixth example of the method, optionally including the first through fifth examples, inserting the support structure in the recess and the opening includes maintaining a position of the support structure in the base substrate layer based on a plurality of fingers molded into a face of a top plate of the support structure. In a seventh example of the method, optionally including the first through sixth examples, the method further comprises: perforating atop plate of the support structure to form through-holes in the top plate and wherein the through-holes are configured to be aligned with an audio assembly. In an eighth example of the method, optionally including the first through seventh examples, forming the through-holes includes inserting rivets into the through-holes, the rivets protruding outwards from at least one surface of the base substrate layer. In a ninth example of the method, optionally including the first through eighth examples, forming the recess and the opening includes cutting the opening into the base substrate layer prior to inserting the support structure to form the recess.

The disclosure also provides support for a method for manufacturing a headliner for a vehicle, comprising: forming an opening in a base substrate layer of the headliner by pressing a wall of a bracket into the base substrate layer until a top plate of the bracket is flush with a first surface of the base substrate layer, removing a portion of the base substrate layer enclosed by the wall of the bracket, and covering the base substrate layer along the first surface with a skin. In a first example of the method, forming the opening in the base substrate layer includes heating the base substrate layer until the base substrate layer becomes more malleable to allow the wall of the bracket to cut into the base substrate layer. In a second example of the method, optionally including the first example, removing the portion of the base substrate layer enclosed by the wall of the bracket includes forming a void within a central cavity of the bracket, the bracket configured to house and support a microphone within the central cavity. In a third example of the method, optionally including the first and second examples, configuring the bracket to house and support the microphone includes adapting the top plate of the bracket with one or more openings aligned with the microphone. In a fourth example of the method, optionally including the first through third examples, pressing the wall of the bracket into the base substrate layer includes pressing a bottom edge of the wall against the first surface of the base substrate layer until the bottom edge reaches a second surface of the base substrate layer, the second surface opposite of the first surface. In a fifth example of the method, optionally including the first through fourth examples, covering the base substrate layer with the skin includes adhering a middle foam layer of the skin to the first surface of the base substrate layer and wherein the middle foam layer is in face-sharing contact with both the first surface of the base substrate layer and the top plate of the bracket.

The disclosure also provides support for a method for forming a layered assembly with a hidden support structure, comprising: embedding the support structure in a base substrate layer of the layered assembly and covering the support structure with a skin, the support structure perforated to allow passage of acoustic signals, and wherein the support structure is invisible when covered by the skin. In a first example of the method, allowing passage of sound waves further includes perforating the support structure and the skin together to align a plurality of perforations in the support structure and the skin. In a second example of the method, optionally including the first example, aligning the plurality of perforations by perforating the support structure and the skin together includes performing the perforating after embedding the support structure in the base substrate layer while the base substrate layer is heated and covering the support structure with the skin. In a third example of the method, optionally including the first and second examples, covering the support structure with the skin includes hiding the support structure from view in a vehicle cabin and indicating a location of an audio assembly, the audio assembly housed in a void of the base substrate layer, within the vehicle cabin based on a placement of the plurality of perforations.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for forming a headliner, comprising:
    forming a recess and an opening for a support structure in a base substrate layer of the headliner during heat treatment of the base substrate layer;
    inserting the support structure in the recess and the opening in a terminal A-side of the base substrate layer until the support structure passes through a terminal B-side of the base substrate layer opposite the A-side, and positioning a top plate of the support structure that extends outward from the support structure in a direction co-planar with the base substrate layer in the recess of the base substrate layer shaped to correspond with the top plate;
    covering the top plate within the recess and the A-side of the base substrate layer with a skin, wherein a positioning of the support structure within the base substrate layer allows an outline of the support structure to be undetectable through the skin by sight or touch; and
    perforating the support structure to allow passage of acoustic signals;
    wherein allowing passage of acoustic signals further includes perforating the support structure and the skin together to align a plurality of perforations in the support structure and the skin; and
    wherein aligning the plurality of perforations by perforating the support structure and the skin together includes performing the perforating after embedding the support structure in the base substrate layer while the base substrate layer is heated and covering the support structure with the skin.

2. The method of claim 1, wherein inserting the support structure in the recess and the opening includes maintaining a position of the support structure in the base substrate layer based on a plurality of fingers molded into a face of a top plate of the support structure.

3. The method of claim 1, further comprising perforating a top plate of the support structure to form through-holes in the top plate and wherein the through-holes are configured to be aligned with an audio assembly.

4. The method of claim 1, wherein forming the recess and the opening includes cutting the opening into the base substrate layer prior to inserting the support structure to form the recess.

5. The method of claim 1, wherein forming the opening for the support structure includes pressing the support structure into the base substrate layer and allowing a wall of the support structure to cut through a thickness of the base substrate layer until the top plate of the support structure is flush with a surface of the base substrate layer configured to be coupled to the skin, the wall extending away from and perpendicular to the top plate and the recess.

6. The method of claim 1, wherein forming the recess includes pressing the top plate into the base substrate layer to form the recess which extends outward from the support structure in a direction co-planar with the base substrate layer and pressing until an upper face of the top plate is flush with a surface of the base substrate layer configured to be coupled to the skin.

7. The method of claim 6, wherein pressing the support structure into the base substrate layer removes a portion of the base substrate layer between the A-side and the B-side of the base substrate layer, and
    the method further comprising inserting an audio assembly into the support structure from a direction of the B-side.

8. The method of claim 7, wherein covering the base substrate layer with the skin enables the audio assembly to be visually undetectable through the skin.

9. The method of claim 8, wherein inserting the support structure in the recess and the opening includes separating the audio assembly from an interior of a vehicle cabin by a thickness of the skin and a thickness of the top plate.

10. A method for forming a headliner, comprising:
    forming a recess and an opening for a support structure in a base substrate layer of the headliner during heat treatment of the base substrate layer;
    inserting the support structure in the recess and the opening;
    covering the base substrate layer with a skin, wherein a positioning of the support structure within the base substrate layer allows an outline of the support structure to be undetectable through the skin by sight or touch; and perforating a top plate of the support structure to form through-holes in the top plate, wherein the through-holes are configured to be aligned with an audio assembly, and wherein forming the through-holes includes inserting rivets into the through-holes, the rivets protruding outwards from at least one surface of the base substrate layer.

11. A method for manufacturing a headliner for a vehicle, comprising:
forming an opening in a base substrate layer of the headliner by pressing a wall of a bracket into a terminal A-side of the base substrate layer until a support structure passes through a terminal B-side of the base substrate layer opposite the A-side and a top plate of the support structure extending outward from the bracket in a direction co-planar with the base substrate layer into a correspondingly shaped recess of the base substrate layer, and a top surface of the top plate positioned flush with a first surface of the A-side of the base substrate layer;
removing a portion of the base substrate layer enclosed by the wall of the bracket;
covering the top surface of the top plate and the base substrate layer along the first surface with a skin; and
perforating the support structure to allow passage of acoustic signals;
wherein allowing passage of acoustic signals further includes perforating the support structure and the skin together to align a plurality of perforations in the support structure and the skin; and
wherein aligning the plurality of perforations by perforating the support structure and the skin together includes performing the perforating after embedding the support structure in the base substrate layer while the base substrate layer is heated and covering the support structure with the skin such that the support structure is invisible.

12. The method of claim 11, wherein forming the opening in the base substrate layer includes heating the base substrate layer until the base substrate layer becomes more malleable to allow the wall of the bracket to cut into the base substrate layer.

13. The method of claim 11, wherein removing the portion of the base substrate layer enclosed by the wall of the bracket includes forming a void within a central cavity of the bracket which is open on an end corresponding to the B-side of the base substrate layer, the bracket configured to house and support a microphone within the central cavity, and the microphone inserted into the bracket from a side of the bracket corresponding to the B-side of the base substrate layer.

14. The method of claim 13, wherein configuring the bracket to house and support the microphone includes adapting the top plate of the support structure with one or more openings aligned with the microphone.

15. The method of claim 11, wherein pressing the wall of the bracket into the base substrate layer includes pressing a bottom edge of the wall against the first surface of the A-side of the base substrate layer until the bottom edge passes through the base substrate layer and exits a second surface of the B-side of the base substrate layer.

16. The method of claim 15, wherein covering the base substrate layer with the skin includes adhering a middle foam layer of the skin to the first surface of the A-side of the base substrate layer, and wherein the middle foam layer is in face-sharing contact with both the first surface of the A-side of the base substrate layer and the top plate of the support structure.

17. A method for forming a layered assembly with a hidden support structure, comprising:
embedding the support structure in a base substrate layer of the layered assembly, the support structure extending from a terminal A-side of the base substrate layer and passing through a terminal B-side of the base substrate layer opposite the A-side, a top plate of the support structure extending outward from a bracket in a direction co-planar with the base substrate layer into a correspondingly shaped recess of the base substrate layer, and the top plate positioned flush with the A-side of the base substrate layer, and
covering the top plate within the recess and the base substrate layer with a skin, the support structure perforated to allow passage of acoustic signals, wherein the support structure is invisible when covered by the skin;
wherein allowing passage of acoustic signals further includes perforating the support structure and the skin together to align a plurality of perforations in the support structure and the skin; and
wherein aligning the plurality of perforations by perforating the support structure and the skin together includes performing the perforating after embedding the support structure in the base substrate layer while the base substrate layer is heated and covering the support structure with the skin.

18. The method of claim 17, wherein covering the support structure with the skin includes hiding the support structure from view in a vehicle cabin and indicating a location of an audio assembly, the audio assembly housed in a void of the base substrate layer, within the vehicle cabin based on a placement of the plurality of perforations.

* * * * *